(12) United States Patent
Long

(10) Patent No.: US 8,468,738 B1
(45) Date of Patent: Jun. 25, 2013

(54) FISHERS DEVICE

(76) Inventor: Rodney Dale Long, Adamsville, AL (US)

( * ) Notice: Subject to any disclaimer, the term of this patent is extended or adjusted under 35 U.S.C. 154(b) by 2326 days.

(21) Appl. No.: 10/727,300

(22) Filed: Dec. 3, 2002

(51) Int. Cl.
*A01K 83/00* (2006.01)

(52) U.S. Cl.
USPC .................. 43/44.83; 43/43.16; 43/44.85

(58) Field of Classification Search
USPC .................... 43/43.16, 44.83, 44.85
See application file for complete search history.

(56) References Cited

U.S. PATENT DOCUMENTS

| | | | | |
|---|---|---|---|---|
| 953,125 | A * | 3/1910 | Desmond | 43/44.85 |
| 2,222,277 | A * | 11/1940 | Baker | 43/44.85 |
| 2,227,420 | A * | 1/1941 | Augenblick | 43/44.85 |
| 2,618,881 | A * | 11/1952 | Gorrias | 43/43.16 |
| 2,870,563 | A * | 1/1959 | Rose | 43/41 |
| 2,979,852 | A * | 4/1961 | Schinke et. al. | 43/43.16 |
| 3,027,676 | A * | 4/1962 | Buttemeier | 43/43.16 |
| 3,130,514 | A * | 4/1964 | Cornick | 43/37 |
| 4,232,470 | A * | 11/1980 | Steffick, Jr. | 43/43.16 |
| 4,294,031 | A * | 10/1981 | Manno | 43/43.16 |
| 4,905,403 | A * | 3/1990 | Manno | 43/43.16 |
| 4,989,360 | A * | 2/1991 | Lewis | 43/42.49 |
| 5,083,394 | A * | 1/1992 | Harwig | 43/43.16 |
| 5,373,658 | A * | 12/1994 | Huppert | 43/42.39 |
| 6,189,257 | B1 * | 2/2001 | Ulrich | 43/43.16 |
| 2004/0261312 | A1 * | 12/2004 | Ravencroft | 43/44.83 |

OTHER PUBLICATIONS

Gouch, Lure of the week:Drop-short rigs take bass fishing deeper, web page, posted Jul. 7, 2005, NWAnews.com, www.nwanews.com.
Vonbrandt, Drop-shotting in Depth, web page, printed Jul. 2, 2006 (date of post unknown), www.findthefish.com.

* cited by examiner

*Primary Examiner* — Darren W Ark

(57) ABSTRACT

A fishers device that enables a hook and hook shaft to maintain a given compound angle with respect to a fishing line. A double eye hook has an upper eye and a lower eye connected by a lever arm. A fishing line can be attached to the upper eye and a tag line passes from the upper eye through the lower eye and the tag line is attached to a weighted member below the hook. The hook angle can be adjusted and once adjusted the fisher's device will maintain the desired angle. The arrangement improves the ability to hook a fish because the fisherman knows the hook is oriented with the hooking end up at all times, improving the ability to hook the fish in the roof of the mouth.

8 Claims, 15 Drawing Sheets

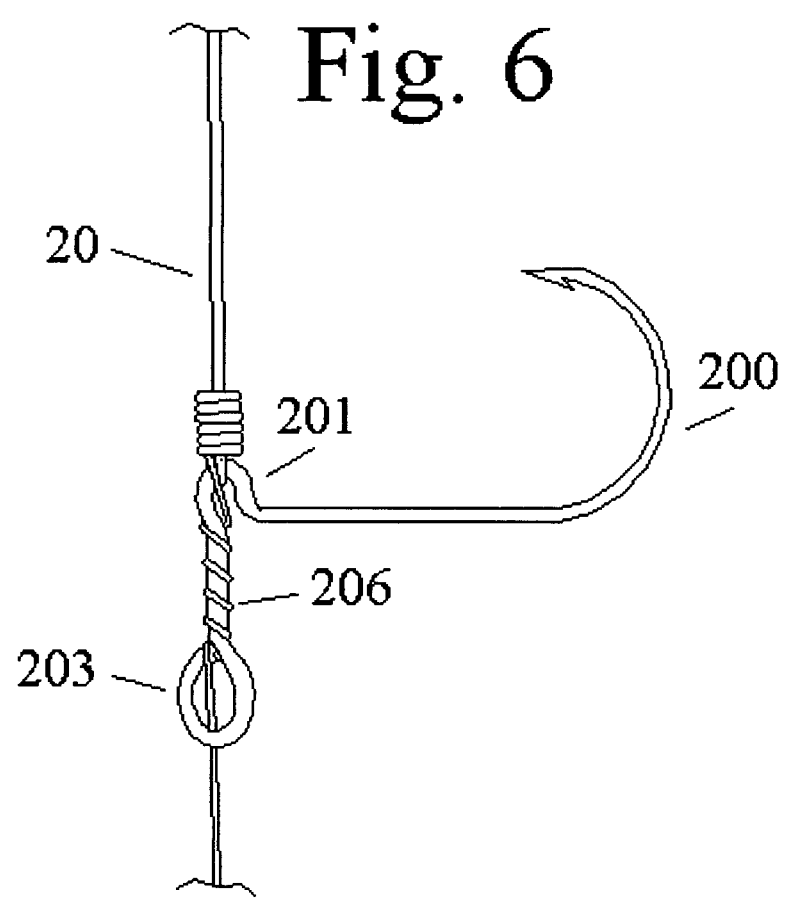

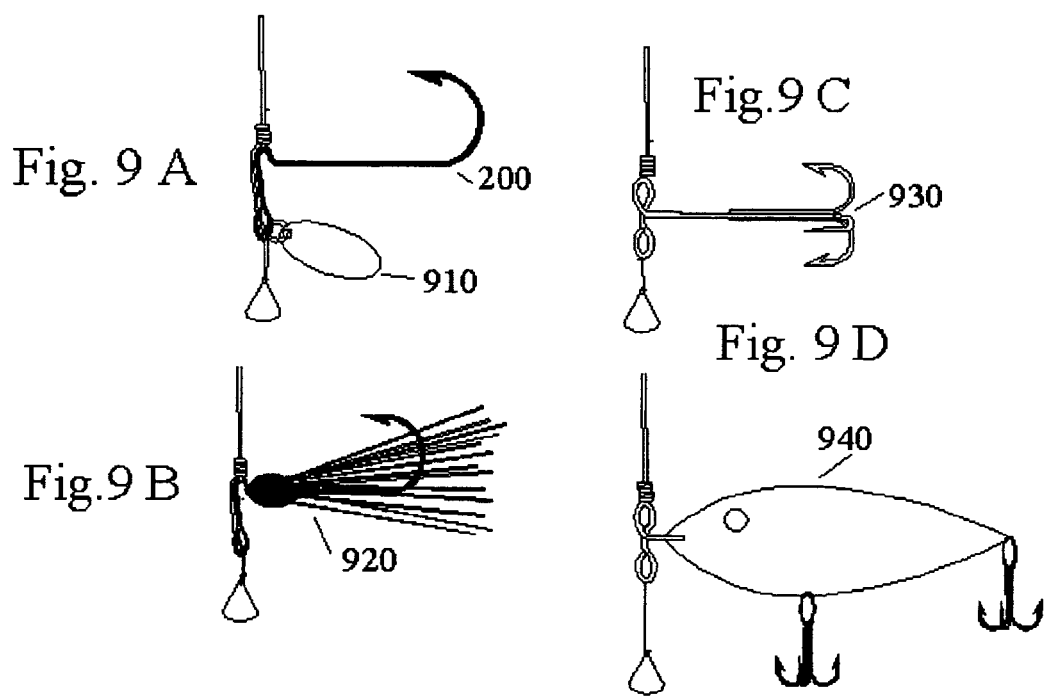

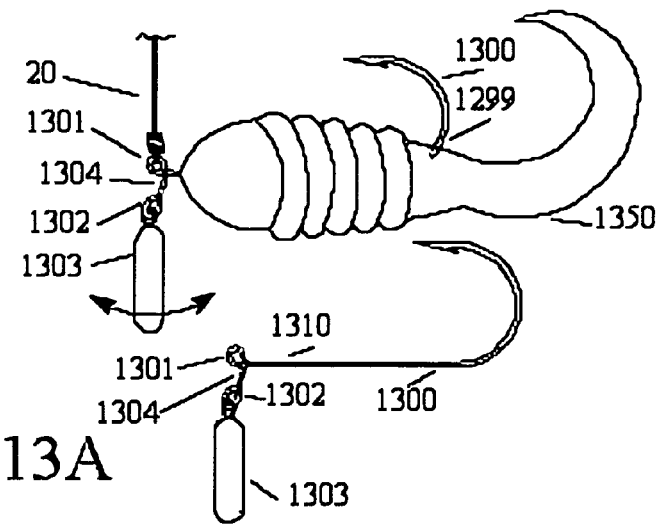
FIG. 13
FIG. 13A
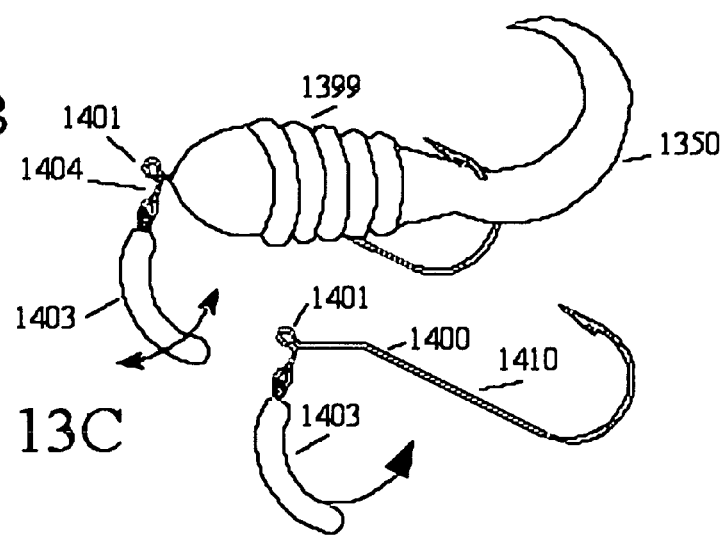
FIG. 13B
FIG. 13C

FISHERS DEVICE

CROSS REFERENCES TO RELATED APPLICATIONS

Provisional Applications: Provisional Application for Patent No. 60/433,938, filed Dec. 17, 2002, with the same title, "Fishers Device", which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable.

BACKGROUND OF THE INVENTION

1. Field of the Invention

This invention relates to a device enabling a means of maintaining a desired orientation of a means of catching a fish, such as, but not restricted to, a hook, snare, artificial bait, or lure.

2. Background Information

Throughout history, man has struggled to advance the art of catching fish, for various and sundry reasons such as, but not restricted to, hunger, sport, sand assurances that he is smarter than the fish.

In using jig hooks, and related hardware, existing art has problems in that there is no sure way to maintain a hook at a desired angle to a line prior to a fish taking the hook and also inside a mouth of a fish. The hooks in the prior art tend to either fail to reliably, snag the fish and/or they can become lodged deep in the mouth of the fish where removal of the hook is difficult and catch and release of the fish is also difficult.

U.S. Pat. No. 2,592,664 to De Mello shows a prior art fishing lure. Primarily intended as a double hook, FIG. 1, '664 does show in FIG. 4 a single hook 29 with an upper eye 27 a lower eye 25, a lever arm 26 between them and a hook shaft 28 held perpendicular to a line 10, and a weight 11. The De Mello patent is primarily designed to maintain the hook in a weedless (column 2 line 40) orientation and is designed to snag fish in the lower jaw. Since most fish dive down when taking bait and hook, and since the fisherman will pull up to set the hook, trying to hook the lower jaw (column 2, line 38) is the least desirable target in many cases. The De Mello patent contemplates only a single position with the hook shaft 28 perpendicular to the line 10 (column 2 line 30) and the hook end 31 in a downward orientation. Finally, the hook 29 of DeMello has a very long hook shaft 28, the hook shaft 28 being 4 or 5 times longer than the apparent diameter of the hook curve 30 of the hook 29. What the long hook shaft 28 means is that the hook end 31 is likely to hook the fish deep in the mouth or gut making catch and release impossible.

As will be seen, the present invention overcomes the limitations of the prior art.

SUMMARY OF THE INVENTION

The present invention in the preferred embodiment is a fisher's device that enables a hook to maintain a given angular orientation with respect to a taut fishing line. The device comprises at least one lower eye and an upper eye separated by a lever arm such that a weight attached to the lower eye can maintain a fisher's device, such as a hook, in a desired angular orientation. Further, the present invention provides a fisher's device that will hook a fish in the upper lip taking full advantage of the natural movement of the fish, and the movement of the fisherman's line while preventing a penetration of the hook into the deep mouth or gut of the fish.

BRIEF DESCRIPTION OF THE DRAWINGS

FIG. 6 illustrates an attachment of the alternate embodiment.

FIGS. 9A, 9B, 9C and 9D illustrate an attachment to the second fifth, sixth and seventh embodiments.

FIGS. 13, 13A, 13B, and 13C illustrate tenth and eleventh embodiments.

DESCRIPTION OF THE PREFERRED EMBODIMENTS

Figure 1:
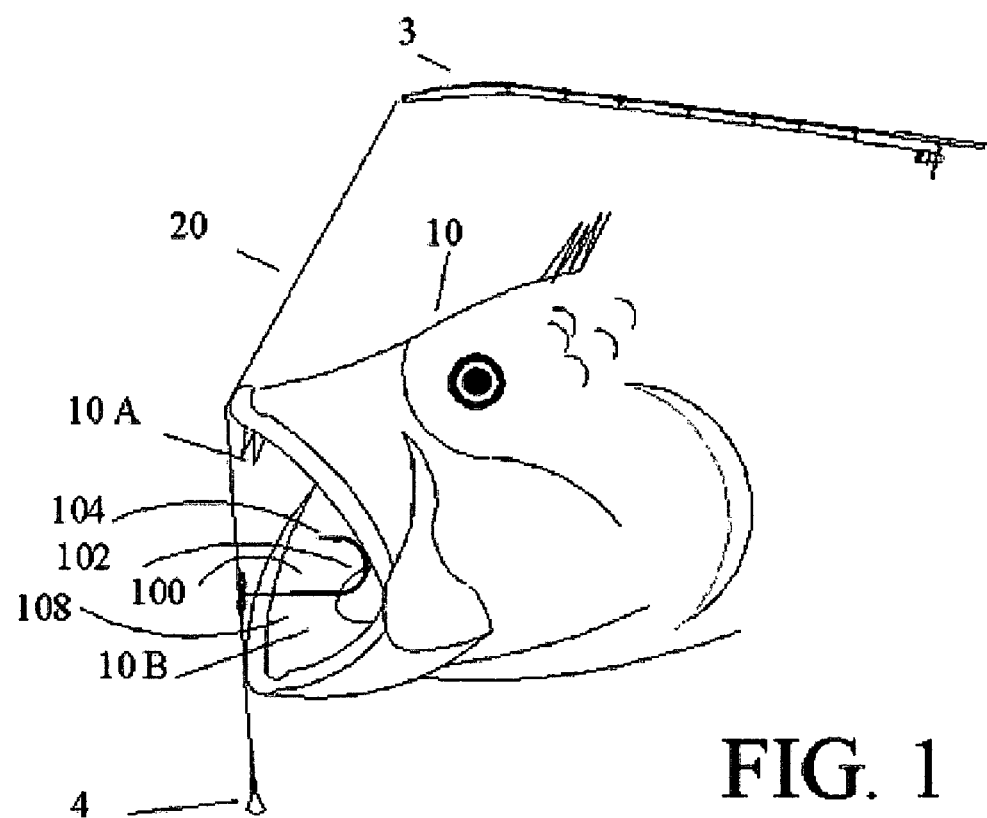
FIGS. 1 and 1A illustrate an application of the preferred embodiment of the present invention.
Figure 1A:
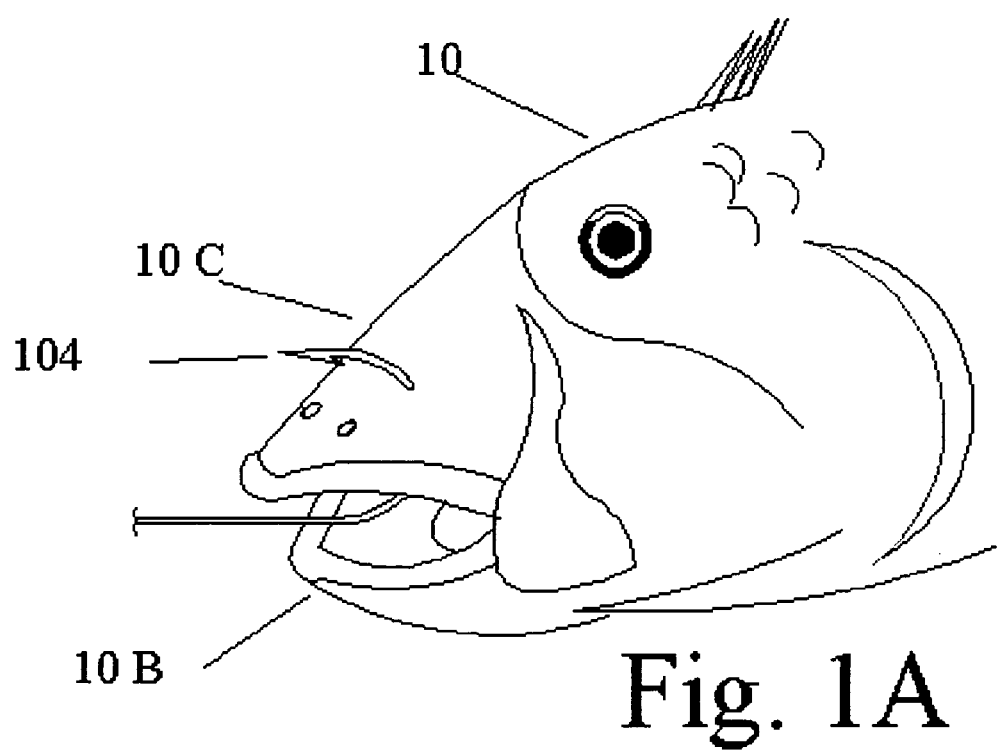

Refer to FIGS. 1 and 1A, for a typical application of the preferred embodiment of the present invention, a fishers device 100 on a taut fishing line 20, off a fisher's rod 3, used in conjunction with a weight 4 is illustrated. A fish 10 is shown in the process of biting on a hook loop 102 which is held in a desired angular orientation by the fisher's device 100. In FIG. 1, the fishers device 100 holds a hook shaft 108 perpendicular to the taut fishing line 20, with a hooking end 104 up. When the fish 10 bites on the hook loop 102, the hook loop 102 is positioned so as to snag the fish 10 in such a way that the mouth 10B of the fish 10 is snagged, but that the hook loop 102 is not deep enough in the mouth 10 B of the fish 10 that the fishing line 20 can be severed by the fish teeth 10A. With the hooking end 104 up, after the fish bites, the hooking end 104 snags a roof 10 C of the mouth 10 B as shown in FIG. 1A. The position of the hook loop 102 and line 20 keep the hook loop 102 from being swallowed deep into the mouth or gut of the fish 10.

Figure 2:
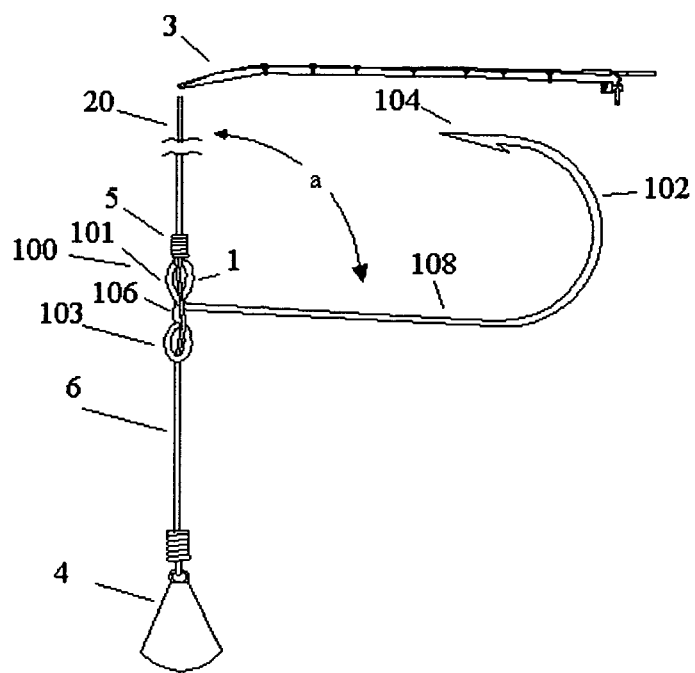
FIGS. 2 and 2A illustrate the preferred embodiment of the present invention.
Figure 2A:
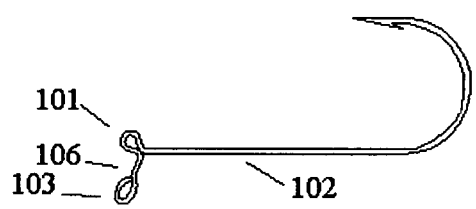

Referring to FIGS. 2 and 2A, the fishers device 100 comprises an upper eye 101, a lower eye 103, a hook shaft 108 and a hook loop 102. A knot 5 secures the line 20 from the fisher's rod 3 to the upper eye 101 of the fishers device 100. A tag line 6 of the knot 5 passes through the lower eye 103 down to the weight 4 which enables the hook shaft 108 to maintain it desired angle 'a' with respect to the line 20. In this orientation, the hook shaft 108 is perpendicular to the line 20 and the hook loop 102 is oriented with the hooking end 104 up. There is a lever arm 106 between the upper 101 and lower 103 eyes. The weight 4 applies torque through this lever arm 106 to maintain the double eye hook fisher's device 100 in the desired angular orientation. The angular orientation of hook fisher's device 100 in the desired angular orientation. The angular orientation of the hook loop 102 is the only stable orientation possible, even while a fish is taking the hook loop 102, the weight and tension in the lines 20 and 6 will continue to hold the hook loop 102 in the orientation shown with the hooking end 104 up. Thus, when a fisher pulls to set the hook loop 102, the hooking end 104 is in the position set. The hook loop 102 has a diameter that is at least ½ the straight portion of the hook shaft 108. A longer hook shaft 108 could cause the fish to swallow the hook loop 102 to a point deeper than would be desired. As can be seen the fishers device 100 can be formed from a single piece of wire.

Figure 3:
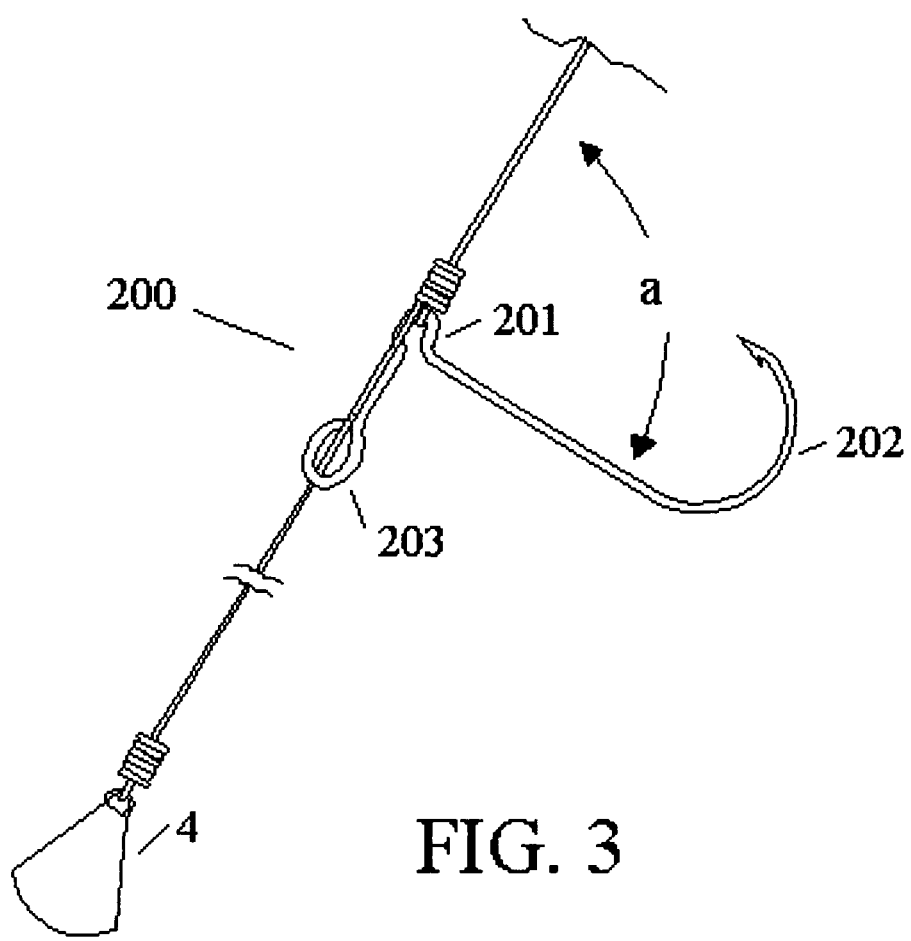
FIG. 3 illustrates an alternate embodiment of the present invention.

FIG. 3 shows an alternate embodiment of the present invention, an open eye fishers device 200. In this embodiment the lower eye 203 can be fully formed but the partial loop upper eye 201 may not be a fully closed loop. The partial loop upper eye 201 formed from a partial loop can be enough to allow for the knot 5 to be secured. This open eye fishers device 200 may be less expensive to manufacture than the embodiment of FIG. 1. FIG. 3 also shows that the hook 202 will maintain the desired angular orientation set even as it is pulled through the water. In this case the weight 4 can continue to create a drag that can keep the hook loop 102 in position.

Figure 4A:
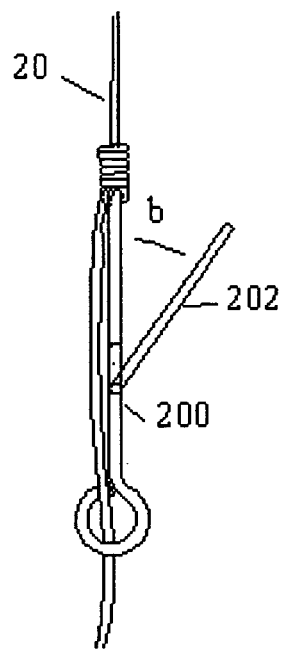
FIGS. 4A and 4B illustrate the alternate embodiment.
Figure 4B:
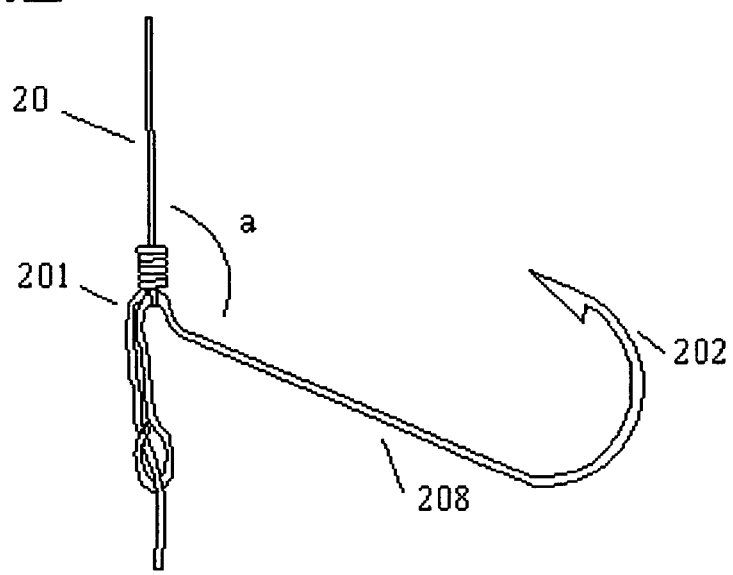

FIGS. 4A and 4B illustrate the ability of the open eye fishers device 200 to hold a variety of adjustable angular orientations. The angle 'a' has been illustrated in FIGS. 1 and 2 as being perpendicular to the line 20, however angle 'a' can be adjusted simply by bending the hook shaft 208 relative to the line 20. FIG. 4B illustrates the hook shaft 208 bent downward to create a larger than 90 degree angle 'a'. FIG. 4A illustrates that the hook 202 can also be bent as desired through an angle 'b' relative to the line 20. The angle 'b' can be adjusted to any angle from 0-360 degrees. Thus the open eye fishers device 200 can be adjusted to any angle 'a" or "b', even when a fisher is on a bank of a pond or stream as the fisher prepares to fish.

Figure 5A:
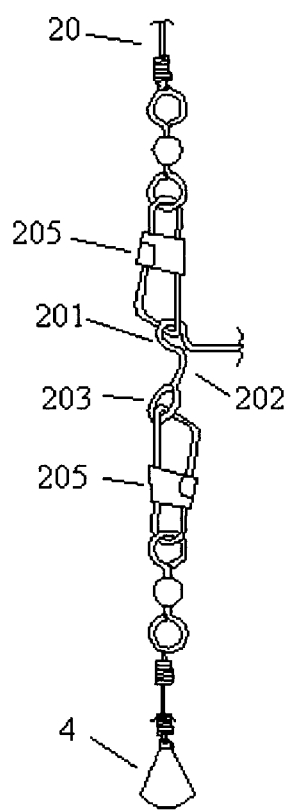
FIGS. 5A and 5B illustrate attachment of the preferred embodiment and of the alternate embodiment.
Figure 5B:
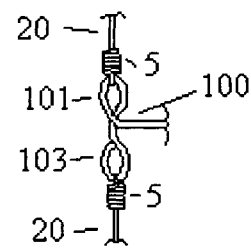

FIG. 5A shows an alternate way of attaching the open eye fishers device 200. In this case conventional swivels 205 can attach to the partial loop upper 201 and lower 203 eyes. Again, the weight 4 can hold the hook 202 in any desired angular orientation. FIG. 5B shows another attachment approach. In FIG. 5B knots 5 can be tied at the upper 101 and lower 103 eyes. Though not shown, a variety of attachment approaches can be used such that the upper eye 101 is secured to the line 20 and the lower eye 103 is secured to the weight 4.

FIG. 6 illustrates another approach to attaching the alternate embodiment of FIG. 3. In FIG. 6 the line 20 can be tied to the partial loop upper eye 201 and then twisted around the lever arm section 206 and then the line 20 can pass through the lower eye 203 and on to the weight 4. This approach can provide a very rigid attachment of the line 20 to the open eye fishers device 200.

Figure 7:
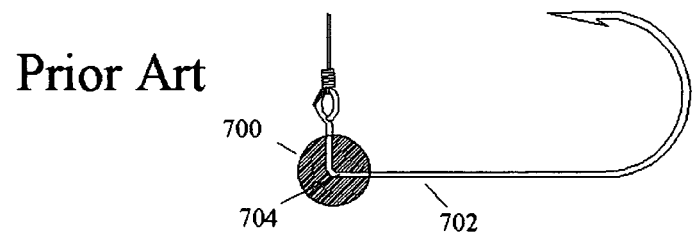
FIG. 7 illustrates a prior art device.

FIG. 7 illustrates a prior art device 700. A bent hook 702 has a weight 704 molded to it. The prior art device could maintain the bent hook 702 in a desired orientation while in the water. But the attachment of the weight 704 directly to the bent hook 702 limits the amount of weight that could be used and often failed to maintain the proper orientation of the hook as the fish took the hook and could be swallowed too deeply by the fish as there is no tag line.

Figure 8A:
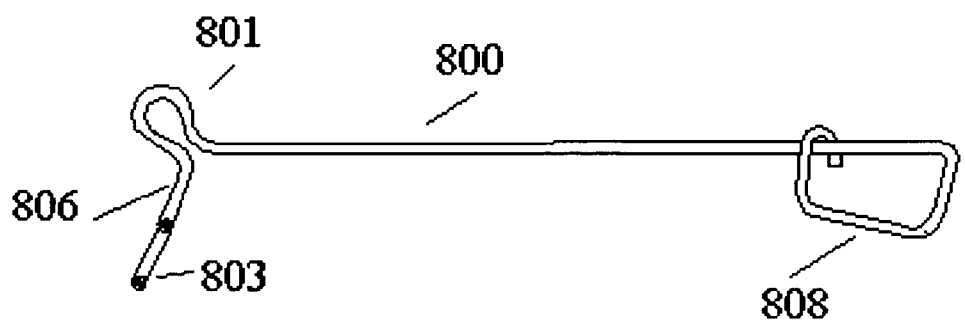
FIGS. 8A and 8B illustrate a third and fourth embodiment.
Figure 8B:
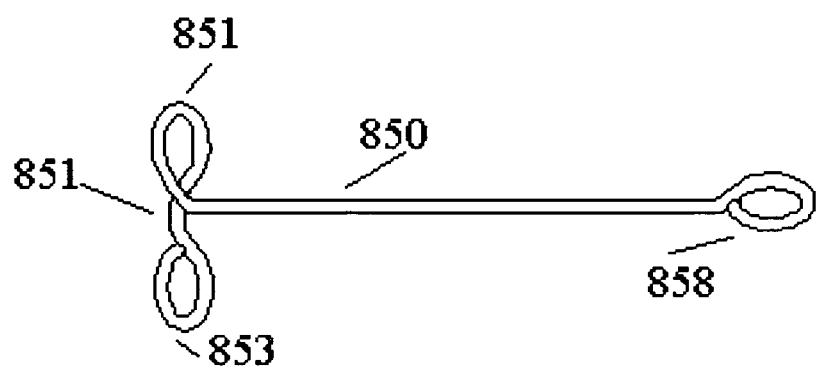

Refer to FIGS. 8A and 8B for a third and fourth embodiment of the concept of the double eye hook device attached to leaders. FIG. 8A illustrates a leader device 800 having an upper eye 801 and a lower eye 803 separated by a lever arm 806. An openable leader attachment 808 can be maintained at any orientation by the eyes. FIG. 8B illustrates a second leader embodiment 850 with upper eye 851 and lower eye 853 separated by a lever arm 856. A closed leader attachment 858 can be maintained at any orientation.

FIGS. 9A, 9B, 9C, and 9D illustrate the concept of the double eye hook device attached to leaders applied to other fishing devices. FIG. 9A illustrates attachment of a rattle 910 to the lower eye 203 of the second embodiment of FIG. 3. FIG. 9B illustrates a fifth embodiment of a headed lure 920 formed on a hook. FIG. 9C illustrates a sixth embodiment showing a multihook device 930. FIG. 9D illustrates a seventh embodiment showing a lure body 940 attached to a fishing line 20 using the double eye device.

Figure 10:
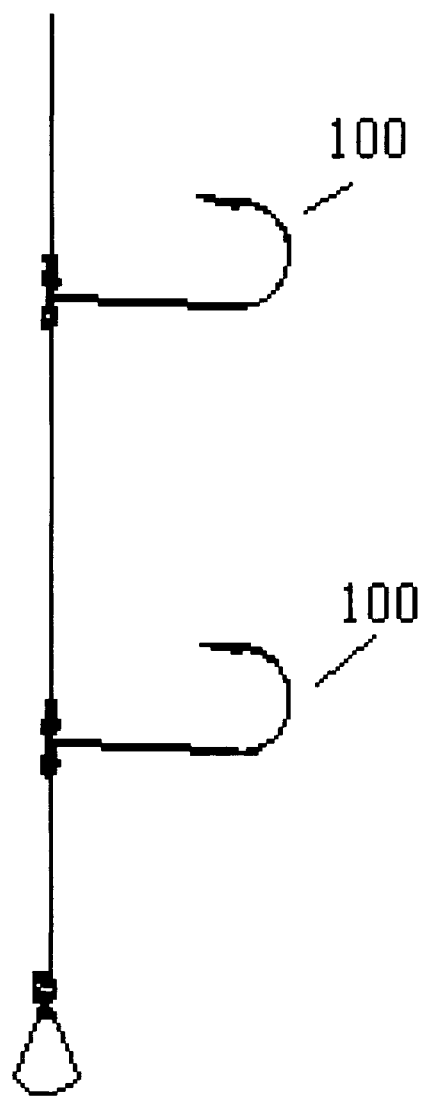
FIG. 10 illustrates the preferred embodiment of FIG. 1 used in double hooking.

FIG. 10 illustrates the use of the device of FIG. 1 in setting up two fisher's devices 100 on one fishing line 20.

Figure 11:
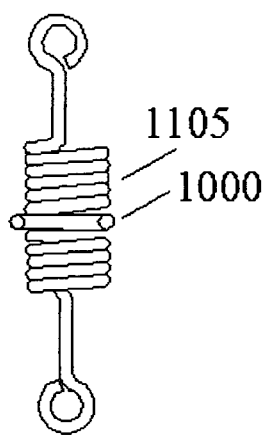
FIGS. 11 and 11A illustrate an eighth embodiment.
Figure 11A:
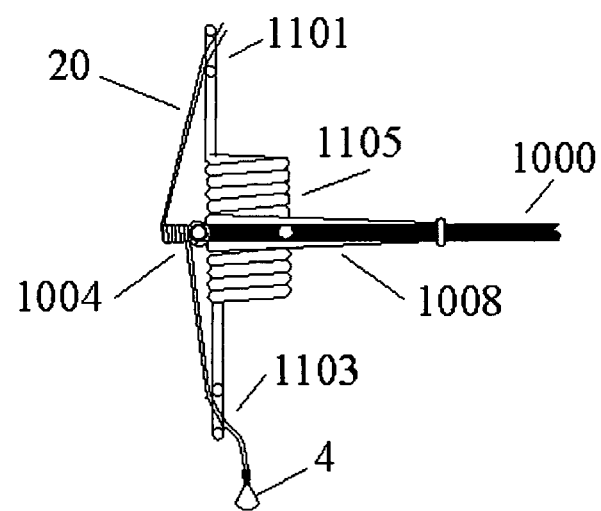

Refer to FIGS. 11 and 11A for an eighth embodiment of a fishers device 1100. The fishers device 1100 uses a conventional single eye hook 1000 having a single eye 1004. The shaft 1008 of the single eye hook 1000 is sandwiched in a spring 1105 having an upper eye 1101 and a lower eye 1103. The fishing line 20 passes through the upper eye 1101, through the eye 1004 of the single eye hook 1000 and then through the lower eye 1103 and on to a weight 4. The fishing line 20 can be tied to any one or all of the eyes 1004, 1101, 1103. The shaft 1008 will maintain a perpendicular angle to the fishing line 20 in this embodiment, and the only adjustment would be to turn the single eye hook 1000 about the axis of the shaft 1008.

Figure 12:
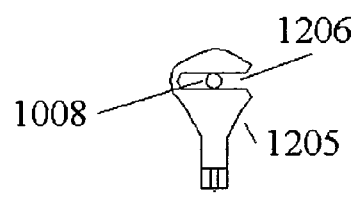
FIGS. 12 and 12A illustrate a ninth embodiment.
Figure 12A:
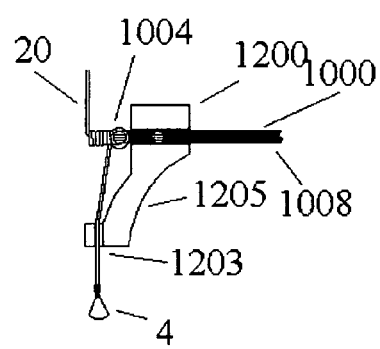

Referring to the FIGS. 12 and 12A, a ninth embodiment of the fisher's device 1200 is shown. This embodiment again employs a conventional single eye hook 1000. The fisher's device 1200 includes a molded body portion 1205. The conventional single eye hook 1000 has a shaft body 1008 that clips into a slot 1206 in the molded body portion 1205. The slot 1206 is narrow enough to grip the shaft 1008 and thereby resiliently hold the shaft 1008 and single eye hook 1000 in place. The fishing line 20 is threaded through the single eye 1004 of the single eye hook 1000, in this embodiment the eye 1004 forms the upper eye. The lower eye 1203 is molded into the lower portion of the molded body portion 1205. The fishing line 20 threads through the lower eye 1203 and attaches to the weight 4. In this embodiment the fishing line 20 can be tied to either or both the upper 1004 and lower 1203 eyes.

Referring to FIGS. 13 and 13A, a tenth embodiment fishers device 1299 comprises a hook 1300 comprising a hook shaft 1310, an upper eye 130, and a lower eye 1303 connected by a lever arm 1304, wherein a weight 1303 is attached to the lower eye 1303. The tenth embodiment further comprises a lure 1350. The line 20 attaches to the upper eye 1301. The weight 1303, in the preferred embodiment, is free to swivel as indicated by the directional arrow.

Referring to FIGS. 13B and 13C, an eleventh embodiment fishers device 1399 comprises a bent hook 1400 comprising a hook shaft 1410, an upper eye 1401, and a lower eye 1403. Said eyes 1401 and 1403 are connected by a lever arm 1404. A weight 1403 is attached to the lower eye 1403. In the preferred embodiment, the weight 1403 is free to swivel as indicated by the directional arrow. The eleventh embodiment 1399 further comprises a lure 1350.

Figure 14C:
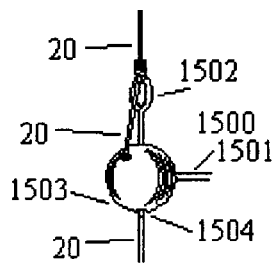
FIGS. 14, 14A, 14B, and 14C illustrate twelfth and thirteenth embodiments.
Figure 14:
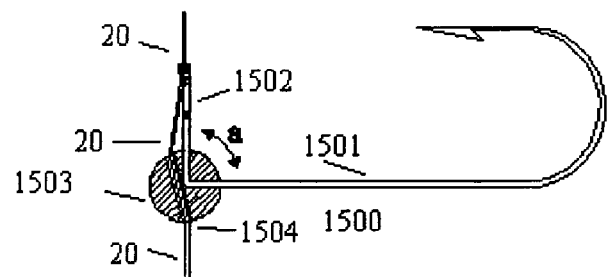

Referring to FIGS. 14 and 14C, a twelfth embodiment fishers device 1500 comprises a hook 1501 with an upper eye 1502 molded within a weight 1503. The line 20 is tied to the upper eye 1502 and then passes through an aperture 1504 in the weight 1503. The aperture 1504 serves as a lower eye. The distance from the upper eye 1502 to the aperture 1504 serves as a lever arm. The hook angle "a" is adjustable by bending the hook 1501 with respect to the upper eye 1502. The line 20 would be attached to at least one weight such as, but not restricted to, the weight 4 shown in FIG. 1, to obtain a taut line 20. The angle "a" can be varied by bending the hook 1501. The hook 1501 is sufficiently stiff to maintain the angle "a". FIG. 14 is a cutaway of FIG. 14C.

Figure 14A:
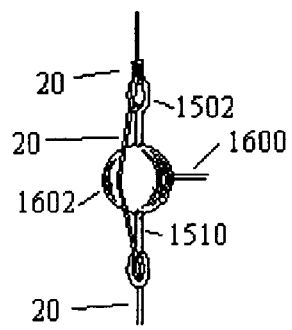
Figure 14B:
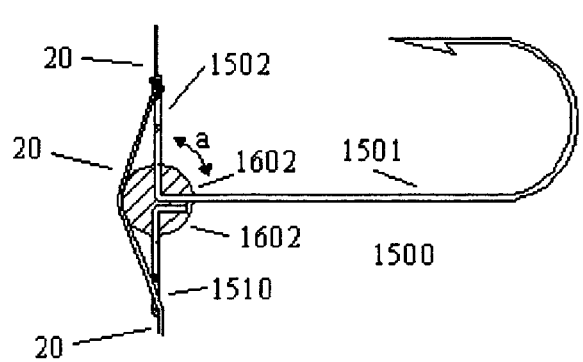

Referring to FIGS. 14A and 14B, a thirteenth embodiment fishers device 1600 comprises the hook 1501 with the upper eye 1502, and a lower eye 1510 wherein the hook 1501 and the lower eye 1510 are molded within a weight 1602. The line 20 is secured to the upper eye 1502, passed around the weight 1602, and through the lower eye 1510 to at least one weight such as, but not restricted to, the weight 4 shown in FIG. 1, to obtain a taut line 20. The distance from the upper eye 1502 to the lower eye 1510 serves as a lever arm. The angle a can be varied by bending the hook 1501. The hook 1'501 is stiff enough to maintain the angle "a". FIG. 14B is a cutaway of FIG. 14A.

Although the description and drawings above contain many specificities, these should not be construed as limiting the scope of the invention but as merely providing illustrations of some of the presently preferred embodiments of this invention. It will be obvious to those skilled in the art that modifications may be made to the embodiments described above without departing from the scope of the present invention. Thus the scope of the invention should be determined by the appended claims in the formal application and their legal equivalents, rather than by the examples given.

The invention claimed is:

1. A fisher's device that enables a hook and a hook shaft to maintain a given hook angle with respect to a taut fishing line, said fisher's device comprising a hook having an upper eye and a lower eye connected by a lever arm; wherein said fishing line is attached to said upper eye and a weight is attached to said lower eye; wherein said hook angle can be adjusted and once adjusted said fisher's device will maintain said angle and wherein said upper eye is a partial loop.

2. The fisher's device of claim 1 wherein said weight is free to swivel with respect to said lower eye and said taut line is tied to said upper eye and wherein said weight holds said lever arm to maintain said hook shaft at said angle.

3. A fisher's device that enables a hook and hook shaft to maintain a desired hook angle with respect to a fishing line, said hook having an upper eye and a lower eye connected by a lever arm; wherein said fishing line is attached to said upper eye and wherein a tag line passes from said upper eye through said lower eye and said tag line is attached to a weighted member below said hook, wherein said hook angle is adjustable and once adjusted said fisher's device will maintain said angle, and wherein the upper eye is a partial loop.

4. The fisher's device of claim 3 wherein a hook end is oriented upward and wherein said device includes a hook shaft extending from said upper eye, and wherein said hook shaft supports said hook and said hook end at said hook angle and wherein said hook angle is adjusted by bending the hook shaft relative to the line.

5. The fisher's device of claim 4 wherein said hook, said end, upper eye and lower eye are formed from a single wire and wherein said hook angle between the line and said hook shaft is adjustable through angles including perpendicular to said line.

6. The fisher's device of claim 4 wherein said tag line is tied to said lower eye.

7. The fisher's device of claim 4 wherein the weighted member acts through said lever arm to maintain said hook shaft at said angle.

8. A fisher's device having a hook end and hook shaft adapted to maintain a given hook angle with respect to a taut fishing line, said hook end carried on said hook shaft, said fisher's device comprising an upper eye and a lower eye connected by a lever arm; wherein said upper eye and lower eye attach said fisher's device to a line and wherein said upper eye is adapted to be tied to said line, wherein said hook angle can be adjusted by bending said hook shaft relative to said taut fishing line, and once adjusted said fisher's device will maintain said angle, thereby holding said hook end at said angle and wherein a weight holds said hook shaft at said angle, wherein said hook end is oriented upward and wherein said angle between said hook shaft and said taut line is adjustable through angles including perpendicular and wherein said hook angle can be adjusted without moving said hook end relative to said hook shaft and wherein said upper eye is an open loop.

\* \* \* \* \*